(12) United States Patent
Brayda et al.

(10) Patent No.: US 12,382,240 B2
(45) Date of Patent: Aug. 5, 2025

(54) METHOD FOR REPRODUCING AN AUDIO SIGNAL

(71) Applicant: ACOESIS SRL, Genoa (IT)

(72) Inventors: Luca Brayda, Genoa (IT); Luca Giuliani, Genoa (IT); Federico Traverso, Genoa (IT)

(73) Assignee: Adrea Granelli (GB)

( * ) Notice: Subject to any disclaimer, the term of this patent is extended or adjusted under 35 U.S.C. 154(b) by 151 days.

(21) Appl. No.: 18/255,097

(22) PCT Filed: Nov. 30, 2021

(86) PCT No.: PCT/IB2021/061130
§ 371 (c)(1),
(2) Date: May 30, 2023

(87) PCT Pub. No.: WO2022/118192
PCT Pub. Date: Jun. 9, 2022

(65) Prior Publication Data
US 2024/0015463 A1    Jan. 11, 2024

(30) Foreign Application Priority Data

Dec. 1, 2020    (IT) .................. 102020000029336

(51) Int. Cl.
*H04S 7/00* (2006.01)
*H04R 3/00* (2006.01)
*H04R 5/027* (2006.01)

(52) U.S. Cl.
CPC ............. *H04S 7/304* (2013.01); *H04R 3/005* (2013.01); *H04R 5/027* (2013.01); *H04S 7/307* (2013.01);
(Continued)

(58) Field of Classification Search
CPC ..... H04R 3/005; H04R 5/027; H04S 2400/11; H04S 2400/15; H04S 2420/01; H04S 7/304; H04S 7/307
See application file for complete search history.

(56) References Cited

U.S. PATENT DOCUMENTS 9,596,554 B2 *   3/2017   Sherman ............... G01S 3/8006
9,838,785 B2    12/2017   Sherman
(Continued)

OTHER PUBLICATIONS

International Search Report and Written Opinion as issued in connection with International Patent Application No. PCT/IB2021/061130, dated Mar. 14, 2022, 9 pages.
(Continued)

*Primary Examiner* — Kile O Blair

(57) ABSTRACT

Method for reproducing an audio signal comprising the following steps: a) acquiring an input audio signal, which acquisition occurs through one or more sensors arranged at an acquisition point of the space envisaged at the body of a user, b) processing said input audio signal, c) generating an output audio signal. Step b) includes creating an acoustic model of the anatomical district at the acquisition point, aimed at eliminating distortions caused by the user's body from said input audio signal, comprising step b) a first and a second processing of the input audio signal, the first processing comprising a filtering in space or beamforming aimed at attenuating the sounds not coming from the direction towards which the user is turned, the second processing comprising a filtering in space aimed at preserving the Head Related Transfer Function (HRTF) based on said acquisition point.

10 Claims, 5 Drawing Sheets

(52) U.S. Cl.
CPC ....... *H04S 2400/11* (2013.01); *H04S 2400/15* (2013.01); *H04S 2420/01* (2013.01)

(56) References Cited

U.S. PATENT DOCUMENTS

2004/0091119 A1\*  5/2004  Duraiswami ........... H04S 1/002
                                                    381/26
2020/0327877 A1  10/2020  Tourbabin

OTHER PUBLICATIONS

International Preliminary Report on Patentability in connection with International Patent Application No. PCT/IB2021/061130, dated May 30, 2023, 7 pages.

\* cited by examiner

METHOD FOR REPRODUCING AN AUDIO SIGNAL

The present invention relates to a method for reproducing an audio signal comprising the following steps:
a) acquiring an input audio signal, which acquisition occurs through one or more sensors arranged at an acquisition point of the space envisaged at the body of a user,
b) processing said input audio signal,
c) generating an output audio signal.

What was just described is the common methodology used to reproduce an audio signal which is used for example in aid devices for hearing impaired users, such as hearing aids and the like.

People hear sounds differently. In fact, every sound emitted by a source is modified both by the path necessary to reach our ears and by the specific shape of the user's body. If the path followed by the sound can be controlled and fixed, the same cannot be said for the anatomical features of the auricles or for the size of the head, which vary individually. Such features allow, among other things, to distinguish the direction of arrival of an ambulance or to concentrate on a voice surrounded by the noise of a cocktail party in a restaurant.

This effect can be represented through a transfer function which is commonly called Head Related Transfer Function (HRTF). HRTF is characterized by variations in both the frequencies and arrival direction of the sound. HRTF can be measured by collecting sound as at the input of both auditory channels.

Consequently, the HRTF is subject to the presence of the head, shoulders and auricle. These unique features, different for each individual person, affect the sound a person hears to the point that, if removed, there is the sensation that noises, voices and any other acoustic signals are no longer "natural".

This deprivation can occur if a user listens to sounds by means of a device located between the user and the source: this is the case of sounds recorded, for example, by a microphone in free space. A microphone being different from our acoustic system, any recorded sound is not subject to the effect of an HRTF. Therefore, any sound recorded by a microphone in this condition does not maintain the features of a natural acoustic scene and is perceived as distorted. The same process occurs for a series of microphones, or a single directional microphone, designed to point (by construction or beamforming) in specific directions.

However, the advantages of the directional power of such solutions are often greater than the disadvantage due to the less natural acoustic scene.

In particular, the present invention relates to a methodology for processing an audio signal, usable on any aid device, whether it be a hearing aid or any wearable device.

In the state of the art, glasses are known which have microphone arrays on the frame which are adapted to acquire an audio signal which is processed so as to attenuate all the sounds not coming from the pointing direction of the microphone array, i.e., from the direction in which the user looks.

A microphone array includes a plurality of passive acoustic sensors positioned in a three-dimensional space.

The sound detected by an acoustic sensor is characterized by the acoustic scene surrounding the microphone array.

The acoustic scene detected by the sensors depends on the propagation paths from the sources to the receivers (the microphones) and can vary based on the environment in which the microphone array is located.

For example, sound propagation is different in an open space with respect to an enclosed space and can further vary based on the geometry of the room or based on obstacles which cause distortions of the audio signal received.

Furthermore, the position of the acoustic sensors near a distortion object (e.g., a part of the user's body, such as the head) can contribute to generating further distortion effects, such as reflections and refractions of sound waves.

Accordingly, if a microphone array is on the side of the human head, then it is subject to acquire distortions due to the presence of the user's body and, in particular in the aforementioned case of glasses, to the masking effects of the head and shoulders.

Because of the distortions, the sound recorded at the entrance of the ear canal, i.e., the sound processed by the inner ear, cannot be the same as that recorded outside the auricle.

Such distortions characterize each subject according to anthropometric parameters and are different between the sides of the head.

An array transfer function (ATF) characterizes how the microphone array processes the sound received from the acquisition step to the generation of the output signal. A microphone array can be associated with several transfer functions which can vary according to the desired processing.

The gain of the array is the specific gain provided by an array with respect to a particular acoustic noise.

The gain of a microphone array, whatever the use of the microphone, is measured by special means aimed at detecting the gain of said array, such as Directivity or the gain of the array depending on the frequency within a spatially isotropic noise field.

A homogeneous set of acoustic sensors share the same frequency response as well as statistics on phase and gain imperfections.

The robustness of a microphone array to such imperfections, whatever the use of the microphone, is measured by means of White-Noise Gain (WNG), which is the frequency-dependent gain of the array with respect to a spatially white noise field.

The aforementioned parameters, Directivity and WNG, are also used and modified in the glasses described above, i.e., to improve the perception of the acoustic scene.

In fact, there are several state-of-the-art solutions which propose peculiar elaborations and adjustments of such parameters.

The known solutions which rely on beamforming, i.e., a spatial filter, which is a signal processing technique used in sensor arrays for transmitting or receiving the signal in a directional manner. Based on such a filter, signals coming from unwanted arrival directions are attenuated while others coming from directions of interest are not altered. Beamforming can be used on both the transmitter and the receiver to achieve spatial selectivity.

A beamformer, i.e., the processing which implements beamforming, aims to provide a spatial filtering used to preserve the signals coming from the direction to which the user is directed, in the desired frequency band.

This is achieved by maximizing the reduction of contributions which do not come from the direction of interest, for example, in the case of microphones provided on glasses, from the direction of the user's gaze, lowering the effect due to the side lobes by narrowing the width of the main lobe of the input audio signal.

Such an effect can be achieved by using a weighting window on the elements of the array.

Any array provided with a beamformer provides a Directionality of the array equal to the directional gain with respect to the use of a single omnidirectional sensor. When the directivity of the array is greater than that obtained from the same array with equidistant elements and a uniform weighting window, the array is called superdirective.

In the state of the art, solutions are known which are not particularly formalized for an application incorporated on glasses or other wearable devices. These applications often refer to hearing aids (HA).

Hearing aids HA, both behind-the-ear (BTE) and in-the-ear (ITE), exploit the position of one or more microphones near or inside the ear and thus benefit from a natural inclusion of the effects of the Head Related Transfer Function (HRTF) on the received sounds. However, their advantage in having an almost ideal position on the user's body for sound reception is associated with their small size, with microphones very close to each other. This limits the potential gain of an array, resulting in obtaining a particularly low array Directivity.

In general, HRTF filtering is aimed at limiting the effects due to the presence of a listener's body within sounds which are received by a device provided with passive acoustic transducers.

HRTF filtering is a solution often adopted to allow to listen to sounds, received through a microphone or a set of microphones, as if they had been collected at the entrance of the auditory canal.

This procedure then considers the effects due to the presence of a listener's body in the sounds which are received by a device provided with passive acoustic transducers.

Therefore, the effectiveness of such a measurement method is as strong as the signals received are comparable to those which would be received in free space. The more this condition is not verified, the more distortions are introduced into the received signals and the subsequent processing is not capable of removing them and may, in some cases, amplify their undesirable effect.

Although the Directivity of the microphones is a parameter of fundamental importance within acoustic aids, it does not take into account, as previously described, the naturalness of the sound which assumes a relevant aspect mainly in two applications.

The first is the peculiar case of people with partial hearing loss. In this case, it is essential to combine the advantage of spatial filtering with the possibility of maintaining the natural sound, i.e., without distortions.

The second is the more general case of wearable devices which are used to record sounds and play the same sounds within the auditory canal.

With regard to directionality, the use of microphone arrays capable of providing a sensitive gain over the entire spectrum of the voice is not achievable by hearing aids, as they are limited by their small size and consequently by a limited number of microphones.

As far as naturalness is concerned, hearing aids effectively face the problem with different techniques: firstly, they modulate their acoustic response according to the subject's peculiar listening abilities; secondly, by virtue of their small size, they record sounds in a privileged position inside the ear (ITE) or very close thereto (BTE). Therefore, the signals acquired by the hearing aids retain most (but not all) of the spectral effects of the HRTF. This specificity is partly lost in wearable devices, such as glasses, provided with microphones positioned far from the ear, as they do not allow to preserve the spectral features of the HRTF in the sound.

From a general point of view, it seems that a technology is directional and cannot be completely natural, because of its position outside the ear, or it is natural, but cannot be completely directional, because of the small size of the devices.

In principle, these two objectives seem contradictory. In fact, reaching superdirectivity requires a spatial filtering which greatly reduces the contributions of the acoustic signals from the external directions to the main lobe, and this result is generally obtained by sacrificing the uniformity of frequency or robustness to errors, such as imperfections in the response of the microphones or in their arrangement within the array. These shortcomings are in contrast to the possibility of recovering the spectral features of the HRTF.

Thus, the known state-of-the-art solutions do not provide methodologies which allow an input audio signal to be processed so as to make such a signal clear to the user listening to it, while maintaining the naturalness of the sound.

Therefore, there is a need which is not satisfied by the methods known in the state of the art to obtain a method which allows to solve the technical problem of simultaneously ensuring directionality and naturalness of a sound acquired by acoustic sensors outside the auditory canal.

The method of the invention is based on the combination of the advantages of superdirective beamforming with the preservation of the HRTF effects.

In the proposed method, the objective is to obtain both the directionality of reception and the naturalness of the reproduced signal, so as to obtain a benefit by means of spatial filtering and preserve the natural HRTF of the subject.

The present invention achieves the above objects by obtaining a method as described above, in which the step of processing the input signal includes making an acoustic model of the anatomical district at the acquisition point, aimed at eliminating the distortions from said input audio signal which are caused by the user's body.

The processing step further comprises a first and a second processing of the input audio signal.

The first processing comprises an acoustic beamforming aimed at attenuating sounds not coming from the direction towards which the user is turned, while the second processing includes a second filtering which retrieves the Head Related Transfer Function (HRTF) based on said acquisition point.

To obtain the result of the combination of both requirements, i.e., directivity and naturalness, in the method of the present invention, a procedure based on two parallel paths is implemented, which use the same configuration of the microphones to perform two distinct and complementary processing steps. The steps are then integrated to return an acoustic signal both with high array Directivity and including the main features of the HRTF.

In the present invention, the undesired distortions generated by the presence of the user's body, which are to be distinguished from the HRTF which is instead to be recovered in the reproduced signal, are first removed in order to obtain a signal as received by the acquisition sensors in free space. This is equivalent to modifying the signal as if the user's body was not present. Second, to fully customize the signal, a post-processing step is applied to later retrieve the natural HRTF signals, which are included in the signal.

This mitigation is performed by applying a pre-processing step to the signals acquired by each acquisition sensor, which calculates a sound equivalent to that received in the absence of the user's body, i.e., in free space.

The calculation is based on using a simplified model of the user's body, or body segment of interest, to remove its effects from the input audio signal.

The proposed method focuses on the possibility of increasing the listening capacity in the desired direction while maintaining the user's natural listening abilities.

The invention is useful in scenarios where the expected result is to provide a clearer acoustic signal in noisy contexts or in the event of sounds coming from distant locations.

The object of the present invention is to reduce the noise and in general the acoustic signals from positions outside the direction of interest, maintaining the original features of the sounds without introducing distortions or altering the user's listening abilities.

As anticipated, Directivity alone is insufficient for ensuring the prefixed object, since the input signals are not acquired in free space and are therefore subject to reflections, delays and attenuation effects (distortions), due to the presence of the user, which determine a distortion in the nominal performance of the spatial filtering.

In the proposed method, such distortion is avoided by considering the presence of the user's body in the pre-conditioning step by means of a simplified acoustic model which mitigates such effects. In the absence of this provision, the signals which would be processed would include such effects which would alter the effectiveness of the spatial filtering process.

At this point the output signals from the spatial filtering are equivalent to those which would be obtained if the input signals were acquired in free space, in the absence of reflection, delay and attenuation effects not due to the configuration of the acquisition sensors.

However, this scenario is not what is desired because, having the objective of keeping the user's listening capacity unaltered as if he were listening to the sounds in the absence of the acquisition sensors and therefore at the entrance of the auditory canal, it does not allow to preserve the HRTF effects, including those of the auricle.

The proposed method then applies a further step for processing the acquired signals, which allows the HRTF features to be recovered.

The execution of this processing must however be carried out taking into account the position in which the signals are received, i.e., outside the auricle. In fact, if the processing were applied directly to the acquired signals, this would add to the effects which these signals already include, as they are subject to distortions due to the presence of the user's body, which are not representative of the entire HRTF, therefore not appreciated.

This would result in a signal which includes a double cumulative effect: the desired one due to the processing which returns the benefits of the HRTF and the unwanted one due to the position of the acquisition sensors.

The proposed method instead includes a preconditioning step, completely equivalent to that used in preparation for spatial filtering, which first allows to remove the spurious effects due to the position of the acquisition sensors and then, through a filtering, allows to recover the user's HRTF as if the sounds had been received inside the ear.

As will be described below through the illustration of some exemplary embodiments, according to a preferred embodiment, the invention includes the use of a microphone array positioned on the temple of a pair glasses, to acquire the input audio signal.

In this case, the proposed method is based on a more direct acquisition system with respect to hearing aids at low frequencies.

According to an embodiment of the method of the present invention, which includes the use of two microphone arrays positioned on the temples of a pair of glasses, the ambient sounds are acquired through a set of microphones arranged on two linear arrays positioned on the sides of the head. In this configuration the received sounds are subject to distortions and delays which depend on the array direction, which in turn are different for each array and for each individual microphone of each array.

It is specified that the term "distorted" refers to any signal acquired in a position other than the inner auditory canal. These distortions are due to the effect of the head, but the acquired signals lose some of the distinctive spectral features of the HRTF.

From the foregoing, it is evident that the method of the present invention can be applied to any number of microphone arrays, whether one, two or more arrays, without modifying the method steps described above.

These and further objects of the present invention are achieved by a method according to the appended independent claims and the sub-claims.

These and other features and advantages of the present invention will become clearer from the following description of some exemplary embodiments illustrated in the accompanying drawings in which.

It is specified that the figures annexed to the present patent application indicate some embodiments of the method object of the present invention to better understand the specific advantages and features thereof.

Such embodiments are therefore to be understood for the purpose of non-limiting explanation of the inventive concept of the present invention, i.e., to obtain a method for reproducing audio signals, preferably used by acoustic aid devices, which allows to reproduce the acquired sound, increasing the cleanliness and clarity thereof and maintaining the naturalness thereof unaltered.

In particular, the figures illustrate the method object of the present invention in the case in which the input audio signal is acquired by two microphone arrays placed on the temples of a pair of glasses.

From what has been described above, it is evident how the method object of the present invention can be used with any acquisition system, preferably a wearable acquisition system or placed at the body of a user.

With particular reference to FIGS. 1 to 5, the invention comprises a method for spatially filtering sound waves propagating in a three-dimensional acoustic scene.

The sound waves surround a series of microphone arrays located on either side of a user's head near the user's ear.

The arrays are used to acquire the input audio signals which are acquired by a series of microphones located at predetermined positions.

The input audio signals are used to feed a beamformer in order to reduce the background noise and provide a natural sensation of the sounds.

The microphones forming the arrays are omnidirectional or directional passive transducers and can be influenced by imperfections in the transducer response, i.e., by gain and phase distortions in both the spatial and frequency domains.

The microphone arrays used for the execution of the method of the present invention consist of more than one element and the position of the elements can be subject to imperfections in their mutual positions, which translate into three-dimensional displacement errors along the axis of the array.

The array processing is performed by both arrays located on the sides of the user's head, i.e., the arrays positioned on the temples of the glasses worn by the user.

The processing step, which will be described in detail later, provides a three-dimensional directive sound collection of the acoustic scene and preserves the natural features of the acquired sounds.

The position of the arrays is designed to naturally adapt to the user's head and the microphones are positioned near the earlobes to acquire the input audio signals as close as possible to the natural acquisition point, where the audio signals are conditioned by the presence of the user's head.

Figure 1:
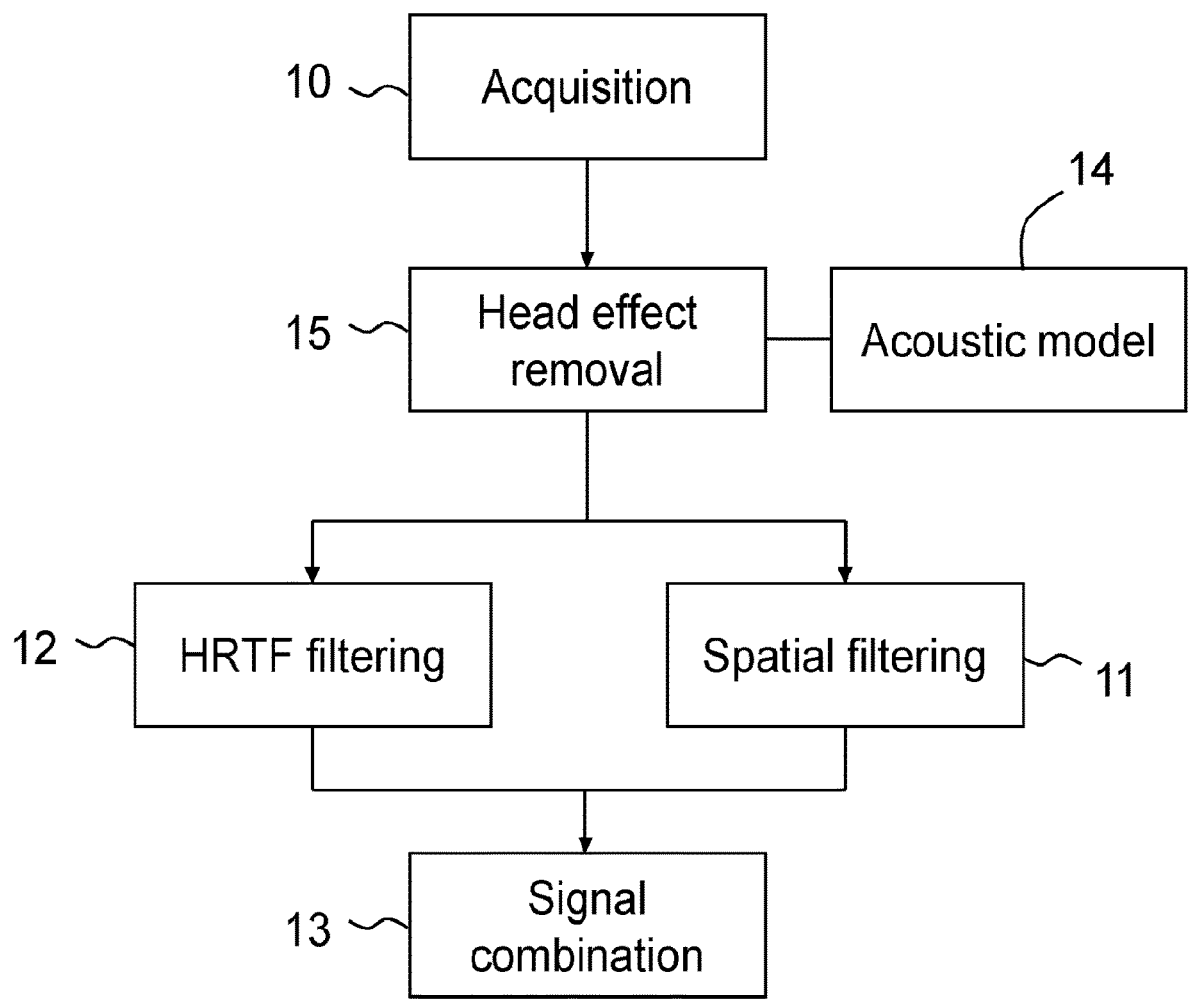
FIG. 1 illustrates the main processing flow of the invention.

FIG. 1 illustrates a first embodiment of the method object of the present invention.

Once the signals are acquired, step 10, from the microphone arrays, such signals are subjected to two filterings according to parallel paths, right side and left side of FIG. 1.

In the first path, right branch of the diagram, a spatial filtering is included through a beamforming procedure, step 11, so as to attenuate all the sound waves coming from directions other than the pointing one, i.e., all the sound waves coming from different directions with respect to the user's direction of observation. The spatial filtering effect also occurs for wavelengths greater than the opening of the microphone array and is aimed at obtaining the superdirectivity of the array.

Step 11 can occur according to two different modes.

In the first mode, the spectral features of the signal coming from all directions are preserved by applying a filter of the frequency invariant type, thus maintaining a constant profile in the band of interest.

In the second case, it is envisaged to obtain the maximum possible attenuation for each frequency by applying a filter of the frequency variant type.

The second path, i.e., the left path with reference to FIG. 1, includes reconstructing that signal part perceived naturally by the user while listening, using a different beamformer: this time a step 12 is included, related to the filtering which reproduces the features of the Head Related Transfer Function (HRTF) based on the acquisition point.

The HRTF target can be measured during a separate or preloaded step with methods known in the state of the art, e.g., by selecting the HRTF from a pre-compiled database which is closest to that of the wearer.

The state-of-the-art databases generally collect several HRTFs, which vary based on the anthropometric features of the user, such as head sizes and the shapes of the auricles.

HRTF models are also available which consider average values in the anthropometric parameters of the population of subjects considered.

Any deviations in the absolute position of the microphones with respect to the designed one and the mutual variations of the frequency response, both in phase and in gain, will be mitigated by the robustness of the beamformers with respect to the spatially independent white noise (i.e., White-Noise Gain WGN).

The outputs of the two paths are combined to obtain a single signal, step 13, which combines the directionality and conservation features of the user's HRTF.

It is specified that in the method object of the present invention, the use of two microphone arrays positioned on the sides of the head, near the auricles, allows to maintain the binaural reception of the received sound and therefore to preserve the listener's ability to determine the input signal arrival direction.

Furthermore, FIG. 1 illustrates two fundamental steps of the method object of the present invention, in particular making an acoustic model of the head, step 14, aimed at eliminating the distortions caused by the user's head from the input audio signal.

Subsequently, with particular reference to FIGS. 4 and 5, such steps will be illustrated in detail.

Figure 2:
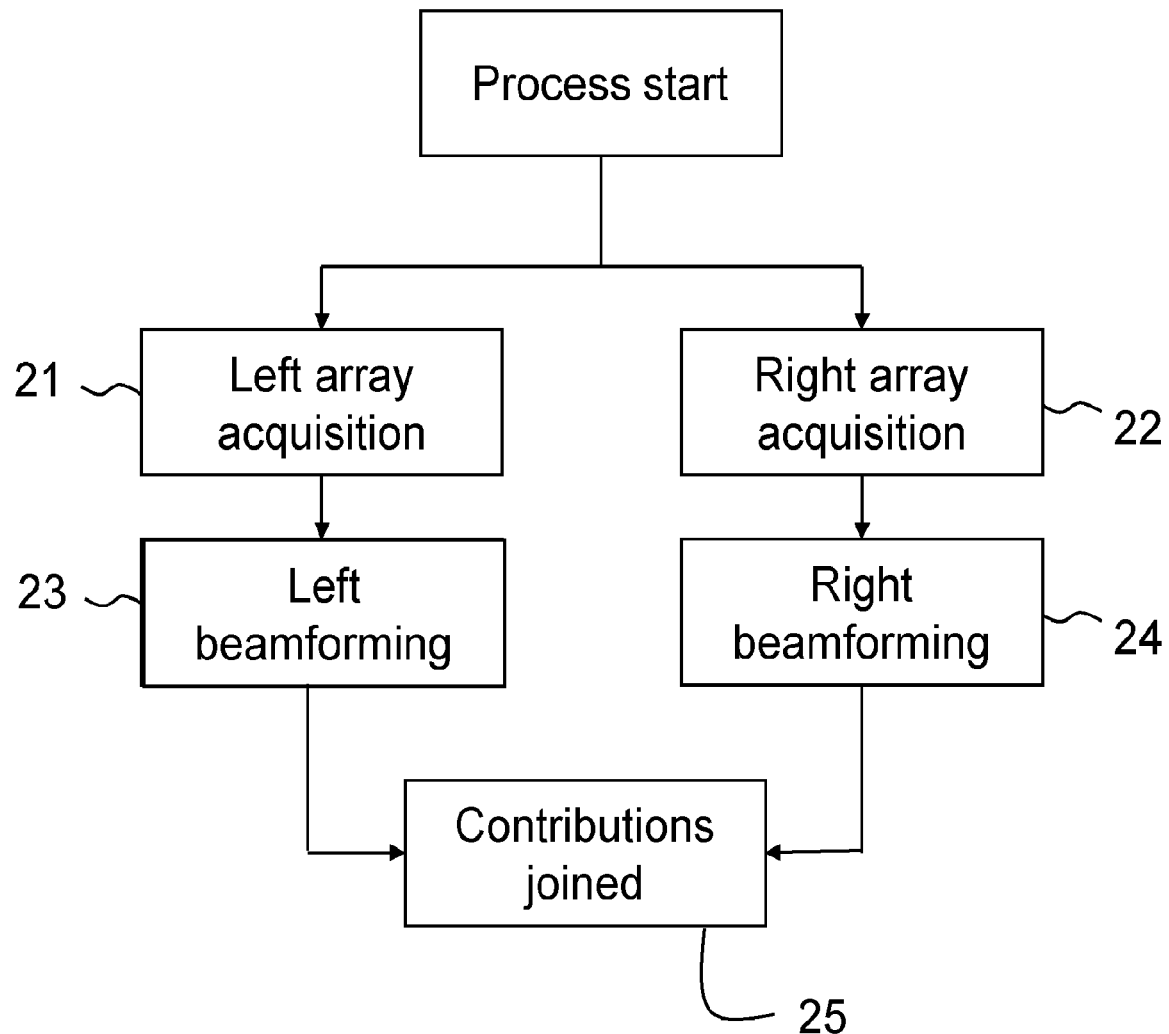
FIG. 2 shows how the processing flow is divided through the set of sensor arrays, defining individual flow paths.

As shown in FIG. 2, in the case in which the method is used in combination with a pair of glasses with a microphone array on each temple, it is essential to include two beamforming processes described in FIG. 1: a first process related to the right ear, a second process related to the left ear.

With particular reference to FIG. 2, the right branch indicates the steps related to the right microphone array, while the left branch indicates the steps related to the left microphone arrays.

As described for FIG. 1, each branch includes an acquisition step 21, 22 and a processing step 23, 24, which occur in a manner entirely similar to that described for FIG. 1 and, at the end of such steps, the right and left contributions in output from the two processes, are joined in step 25.

The two processes are not identical.

Each process (related to the right array and the left array) performs a separate processing which essentially depends on the fact that the HRTF differs if measured on the right or on the left and therefore the HRTF filtering will be different. The spatial filtering will instead be the same or not depending on design choices.

Since the arrays acquire the sounds at a mutual distance, the inter-aural level difference (ITD) is kept constant, while to obtain a "natural" inter-aural time difference (ITD), the sound should be received at the entrance of the ear canal.

Figure 3:
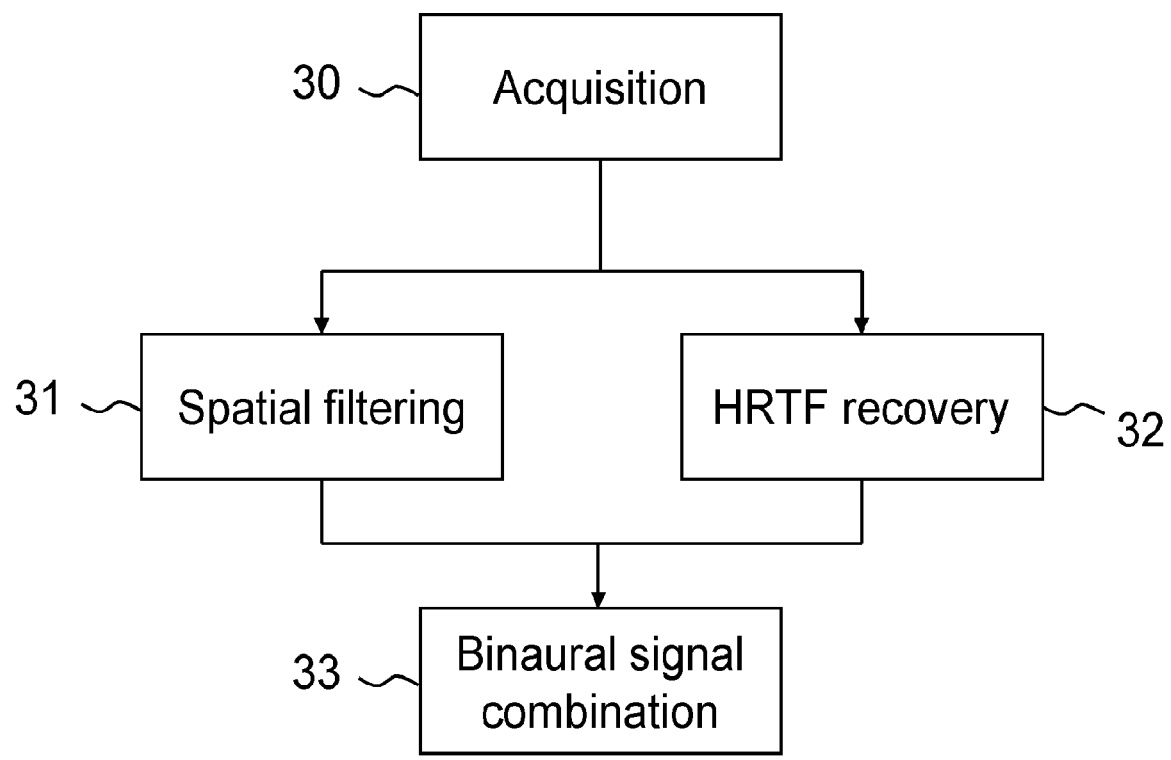
FIG. 3 depicts the details of the processing step within a single microphone array.

In the method object of the present invention such an aspect is satisfied by virtue of filtering with HRTF, preferably after removing the "undesired" effects with the preconditioning, in order to recover two features which allow the user to distinguish the arrival directions of the sounds FIG. 3 illustrates a possible embodiment of the method object of the present invention and illustrates the method steps occurring in one of the two microphone arrays.

The method steps which will be described related to FIG. 3 will then be repeated for all the microphone arrays present, in the specific case, in the other microphone array.

An input audio signal is acquired, step 30, by a microphone array and such a signal is processed according to two simultaneous processes, so as to obtain a spatial filtering 31 and the HRTF recovery 32 simultaneously.

Unlike what is described in FIG. 1, obtaining the conditions equal to those in free space, i.e., the elimination of the effects of the head on the input audio signal (steps 14 and 15 of FIG. 1) are performed internally at steps 31 and 32, according to methods which will be described later.

The opening of the microphone array, i.e., its physical dimensions in three-dimensional space, is comparable with the size of the head for the average values of human anthropometric parameters.

The mutual positioning of the array elements is designed to comply with the spatial sampling limit $d \leq \lambda/2$, where d is the spacing between the elements and $\lambda$ is the signal wavelength.

The filter bank to which the weighting window is applied which implements the beamformer on the microphone array or the filter-and-sum beamforming is designed to process signals acquired with a sampling frequency compliant with the Nyquist limit $\tau \leq \frac{1}{2} f_{mas}$, where $\tau$ is the sampling period and $f_{max}$ is the maximum frequency of interest for the invention.

Figure 4:
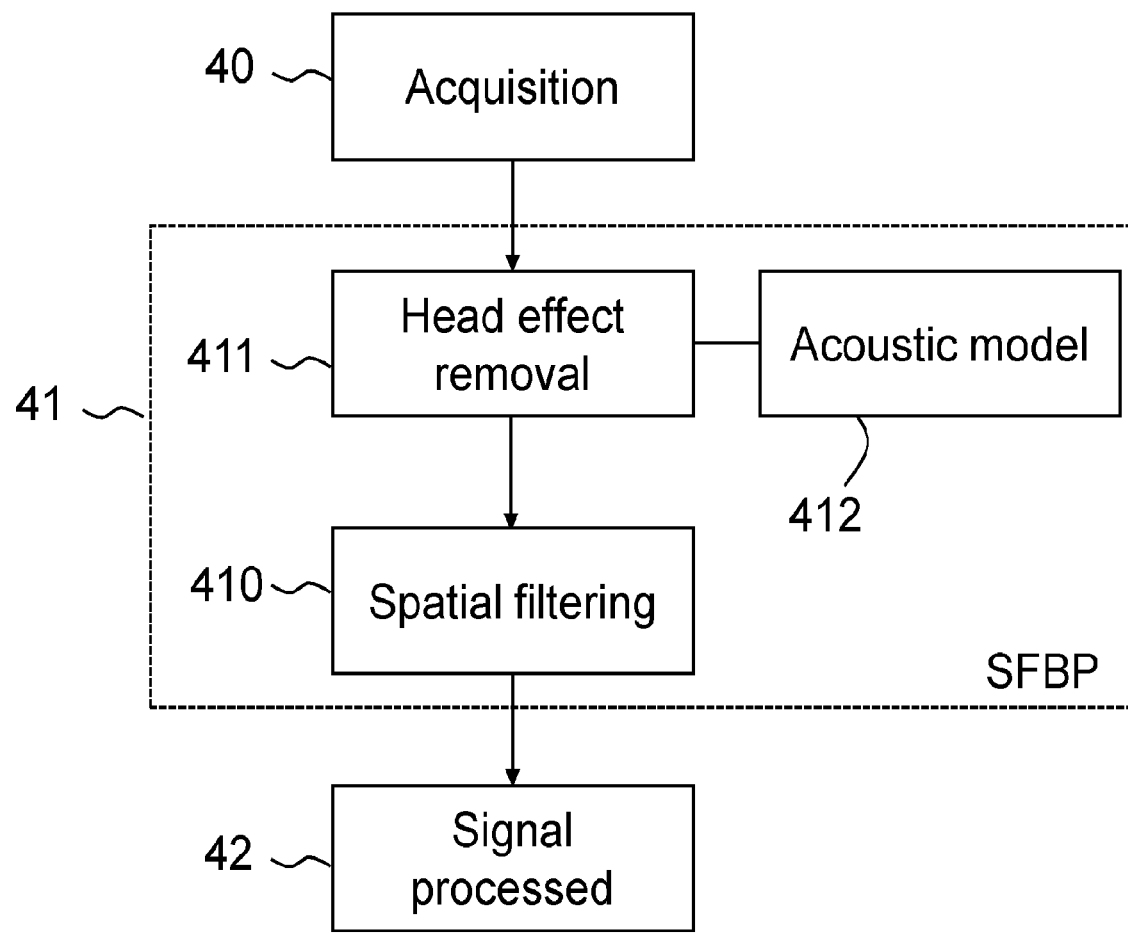
FIG. 4 depicts the details of the spatial filtering step within a single array.
Figure 5:
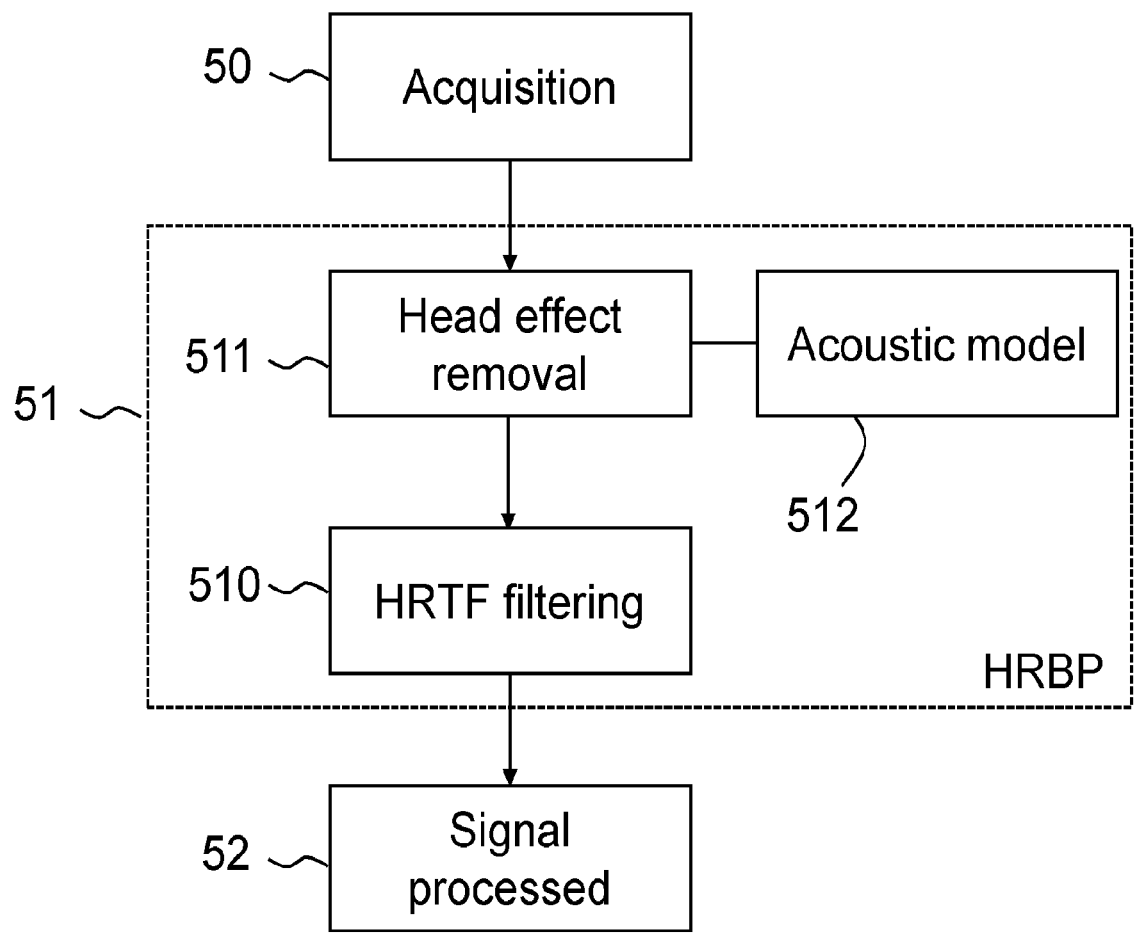
FIG. 5 depicts the details of the HRTF filtering step within a single array.

FIGS. 4 and 5 illustrate in detail the two processes which are performed on the input audio signal, in particular FIG. 4 is related to the spatial filtering processing, while FIG. 4 to the HRTF filtering.

As previously anticipated, with reference to the specific case of a microphone array, an input audio signal acquisition step 40, a processing step 41, and an output signal generation step 43 are included.

The processing step 41 comprises the spatial filtering of the signal 410, as well as the elimination of signal distortions due to the presence of the head 411, by virtue of the creation of an acoustic model of the head 412.

The design of the filter used in the processing step 41 is shown below.

The frequency response of the n-th filter is $H_n(f)$, where f is the frequency in Hz and $w_{n,l}$ represents the l-th coefficient of the filter.

The sensor which feeds the filter acquires the signals with a specific time delay depending on the position thereof and the signal direction of arrival.

The contribution of the signal hitting the n-th sensor is $\omega_n(\theta,f)$.

Considering these preliminary functions, it is possible to define the Beam Pattern of the array or its response in the domain of the frequency and the directions of arrival:

$$BP(\theta,f,w) = \Sigma_{n=0}^{N-1} H_n(f) \cdot \psi_n(\theta,f) \quad (1)$$

where w is a vector containing the filter coefficients.

The array performance is generally measured by the array response or Beam Pattern. However, once a detailed analysis has been requested, it is more appropriate to define different assessment methods. The array gain (AG) indicates the improvement of the signal-to-noise ratio provided by the array, as a single omnidirectional sensor, with respect to a specific noise source:

$$AG(f) = \frac{SNR_{array}(f)}{SNR_{sensor}(f)}$$

In order to evaluate the performance of a filter-and-sum beamforming applied to a superdirective array, it is important to determine the system's ability to reduce isotropic noise, i.e., noise uniformly distributed over a sphere, and spatially white noise, i.e., unrelated noise between the microphones of the array. The array gain in the two cases is defined as: Directivity and WNG. Directivity and WNG play a central role in the design of a superdirective array and there is a compromise between their values.

The Directivity of the array represents the ability of the spatial filter to attenuate the signals coming from all the directions except that of interest. This is essential especially for the acoustic system working in an environment in which different sources coexist, which aims to select or isolate a particular source.

The Directivity of the array as a function of the frequency G(t) of a linear array is defined as the ratio between the square amplitude, i.e., the power of the Beam Pattern in the direction of interest $\theta_m$ and the power of the array output with isotropic noise as input signal.

Considering a filter-and-sum beamforming system, it is possible to replace the terms in the numerator and denominator with the corresponding ones for the Beam Pattern. Depending on the geometry of the array, the Directivity of the array can be expressed as a function of the mutual distance between the elements of the array.

For example, for a linear array with uniformly spaced elements (ULAs), the directivity of the array can be expressed as follows:

$$G(f) = \frac{\left|\sum_{n=0}^{N-1} H_n(f)\right|^2}{\sum_{m=0}^{M-1}\sum_{n=0}^{N-1} H_n(f) \cdot H_m^*(f) \cdot sinc\left[(n-m) \cdot 2\pi f \cdot \frac{d}{c}\right]}$$

where M=N, the apex denotes the conjugate complex and sync($\alpha$) is defined as $\sin(\alpha)/\alpha$.

The equation links the response of the filters to the ability of an array to discriminate the signal arrival direction.

The WNG indicates the improvement of the signal-to-noise ratio provided by the array, with respect to a single omnidirectional sensor, for the unrelated noise between the sensors, defined as spatially white noise. In the case of a filter-and-sum beamformer structure, the WNG value with respect to frequency, $G_w(f)$, can be defined as follows:

$$AG_{white}(f) \equiv G_w(f) = \frac{\left|\sum_{n=0}^{N-1} H_n(f)\right|^2}{\sum_{n=0}^{N-1} |H_n(f)|^2}$$

Similar to what has been discussed regarding the directivity of the array, the WNG also depends on the responses of the filters Hn(f).

A special case of weighting window is uniform weighing, i.e., $w_n = 1/N$.

For example, in a ULA, using this weighting window, the Directivity of the array is maximized when $d = \lambda/2$ and is equal to the limit value $G(f) = N$. Since uniform weighing maximizes the Directivity of the array for $d = \lambda/2$, it follows that the superdirectivity is efficient in improving the performance of the array especially for those frequencies whose wavelengths are sufficiently far from the condition $d = \lambda/2$, i.e., $\lambda \gg 2 \cdot d$ or in general $d \ll \lambda$.

The uniform weighting maximizes the WNG of a ULA and $G_w(f) = N$ without dependence on the mutual distance between the elements d.

Thus, the WNG also represents a measurement of beamformer robustness with respect to array imperfections.

Since the superdirective beam pattern is known to be very sensitive to unrelated noise between the sensors, the robustness becomes a crucial point and, as a result, an excessive decrease in the WNG value cannot be accepted.

The WNG indicates the improvement of the signal-to-noise ratio provided by the array, with respect to a single omnidirectional sensor, relative to the spatially white noise. The noise related to the sensors and imperfections which usually influence the features of the arrays (i.e., the positions of the elements and the responses of the sensors) are not correlated between the elements and can be considered as a spatially white noise.

Considering the geometry of a linear array and assuming the beamformer as a function of array imperfections, the actual response of the n-th filter and the actual position of the n-th element can be modelled as follows:

$$H_n^e(f) = H(f) \cdot (1 + \delta g_n(f)) \cdot \exp(j \cdot \delta \varphi_n(f))$$

$$p_n^e = p_n + \delta p_n$$

where $H_n^e(f)$ is the perturbed frequency response of the n-th filter, $H_n(f)$ is the nominal frequency response of the n-th filter, $\delta g_n(f)$ and $\delta \varphi_n(f)$ are random variables representing the gain and phase deviations of the n-th transducer response, respectively, $p_n^e$ is the actual position of the n-th element of the array, $p_n$ is its nominal position and $\delta p_n$ is a random variable representing the position error.

It is generally acceptable to consider such errors as random Gaussian variables with zero mean, statistically independent of each other and between the elements (sensors), and the distortions of the sensor response as frequency-dependent.

The reciprocal of the WNG, called sensitivity function, indicates the beamformer's sensitivity to the imperfections of the array. Accordingly, an excessive decrease in WNG is indicative of insufficient robustness to these errors.

The processing of the filter-and-sum process applied in FIG. 4 for the spatial filtering and in FIG. 5 for the HRTF filtering is performed with a low-sensitivity filter bank by carefully designing $H_n(f)$ in equation 1, where the term "low sensitivity" means that the filter bank is robust with respect to spatially white noise. In particular, the low sensitivity is obtained with respect to the errors in the mutual positioning of the elements along the array and the error in the response of the transducers, i.e., gain and phase. The robustness of the beamformer can be obtained by applying frequency invariant filtering or frequency variant filtering.

As a result, the filters synthesized in steps 41 and 51 are robust against spatially white noise, i.e., with WNG greater than 0 dB for most of the beamformer's working frequency band.

As described in FIG. 1, steps 13 and 14, FIGS. 4 and 5 also include creating an acoustic model of the head and an elimination of the contributions which the user's head has on the signal, steps 412, 413, 512, 513.

In detail, these steps first occur with a beamforming filter designed to remove the "head shadowing" effect due to the position of the microphone arrays and to obtain a signal such as that processed by the same spatial filtering function in the absence of the head, i.e., a spatial filtering in free space. This is achieved by acting on the contribution of signals which interfere with the array sensors, i.e., the terms $\psi_n(\theta, f)$ in equation (1).

As detailed in FIG. 1, the signal distortions caused by the head are taken into account by emulating the relative frequency transfer function of a standard head model, i.e., a spherical model.

Such a transfer function is incorporated into the transfer function of the beamformer, from the measurement of $H_n(f)$ in equation (1), to reduce the reflections and refractive effects of the presence of the head in the sound field collected by the microphones.

Advantageously, the removal of the head effect is part of the mathematical modelling of the beamformer: it is not a pre-processing or post-processing step.

Such an approach is used to obtain both the free-space spatial filtering stage and the free-space HRTF filtering stage in FIG. 3.

Each single path in FIG. 3 is dedicated to a spatial filtering performed through a superdirective beamformer which allows to obtain a high Directivity of the array even at low frequencies.

In doing so, two advantages are obtained: on the one hand, the spatial filtering allows to reduce the contribution of undesired signals coming from directions outside the user's observation directions, on the other hand, the output of this first stage is an acoustic signal without the distortion effects caused by the presence of the head.

Both effects are obtained using an appropriate choice of $H_n(f)$ and $\psi_n(\theta, f)$ in equation (1).

The ATF of the spatial filtering stage can be represented by the spatial filtering SFBP($\theta$,f), where $\theta$ is the direction of arrival measured in degrees and f is the frequency measured in Hz.

With particular reference to FIG. 5, each signal acquired by the arrays is further processed by an HRTF filter which reconstructs the spectral signals related to the presence of the head obtained by recording the sound field in the auricle position.

The natural HRTF is obtained by filtering the signals acquired by the microphones with a beamforming-based approach, i.e., with an ad-hoc set of $H_n(f)$ in equation (1), which replicates the head transfer function measured near the auricle.

The target HRTF is measured by the microphone closest to the auricle position for a sound field in the frequency band of interest of the method object of the present invention. The synthesized HRTF transfer function can be reduced in complexity by sub-sampling the frequency points obtained from the measurements.

The HRTF filtering is processed by a beamformer with a nominal beam pattern which replicates the amplitude of the measured HRTF (i.e., the target HRTF) and has a linear phase.

The filtered HRTF signals are not subject to phase distortions and retain their natural delay with respect to the opposite side, i.e., the filtered HRTF signal from the other array, positioned on the opposite side of the head.

The ATF of the HRTF filtering process can be represented by the head related beam pattern HRBP($\theta$,f), where $\theta$ is the arrival direction measured in degrees and f is the frequency measured in Hz.

Once the processing described has been completed, the output signals from such processing processes must be combined.

Accordingly, the output signals from the spatial filtering and the signals carrying the reconstructed HRTF are combined to obtain a pair of directional signals with unchanged naturalness features, which are used to feed the active acoustic transducers of the invention.

As depicted in FIG. 3, the binaural signals processed by the set of arrays can be combined, step 33, to enrich the acoustic peculiarities of the signals acquired by the microphones in terms of spatial and frequency features.

The signal processed by the superdirective filtering beamformer, in which all the directions outside that of interest are attenuated, is combined with the signal processed by the HRTF calculation beamformer.

The result of this operation is a monophonic signal which includes both the directivity of the array provided by the spatial filtering and the fidelity provided by the HRTF filtering.

The ATF of the complete monoaural stage (i.e., a single path of FIG. 2) can be represented by the monoaural beam pattern MBP(θ,f):

$$MBP(\theta,f)=Q(SFBP(\theta,f),HRBP(\theta,f))$$

where Q is the combination function, θ is the arrival direction measured in degrees and f is the frequency measured in Hz.

The two monoaural beam models can be further combined to exploit their acoustic scene representation in a beam pattern model (see FIG. 2) for the right side BRBP (θ,f) and for the left side BLBP (θ,f):

$$BBP_{right}(\theta,f)=K(MBP_{right}(\theta,f),MBP_{left}(\theta,f))$$

$$BBP_{left}(\theta,f)=U(MBP_{right}(\theta,f),MBP_{left}(\theta,f))$$

where K and U are the combination functions for the right and left side respectively, MBPright is the right side monoaural beam pattern, MBPleft is the left side monoaural beam pattern, θ is the arrival direction measured in degrees and f is the frequency measured in Hz.

While the invention is susceptible to various modifications and alternative constructions, some preferred embodiments have been shown in the drawings and described in detail.

It should be understood, however, that there is no intention of limiting the invention to the specific illustrated embodiment but, on the contrary, it aims to cover all the modifications, alternative constructions, and equivalents falling within the scope of the invention as defined in the claims.

The use of "for example", "etc.", "or" refers to non-exclusive non-limiting alternatives, unless otherwise stated.

The use of "includes" means "includes but not limited to", unless otherwise stated.

The invention claimed is:

1. Method for reproducing an audio signal comprising the following steps: a) acquiring an input audio signal, which acquisition occurs through one or more sensors arranged at an acquisition point of the space envisaged at the body of a user, b) processing said input audio signal, c) generating an output audio signal characterized in that step b) includes creating an acoustic model of the anatomical district at the acquisition point, aimed at eliminating distortions caused by the user's body from said input audio signal, comprising step b) a first and a second processing of the input audio signal, the first processing comprising a filtering in space aimed at attenuating the sounds not coming from the direction towards which the user is turned, the second processing comprising a filtering in space aimed at preserving the Head Related Transfer Function (HRTF) based on said acquisition point.

2. Method according to claim 1, wherein said first processing and said second processing occur simultaneously and independently, on the same input audio signal and with the same one or more sensors, step c) including joining the signals resulting from the first and second processing.

3. Method according to claim 1, wherein the step of making the acoustic model of the anatomical district at the acquisition point is envisaged during both the first processing and during the second processing.

4. Method according to claim 1, wherein the first processing includes the use of a filtering of the frequency variant type.

5. Method according to claim 1, wherein the first processing includes the use of a filtering of the frequency invariant type.

6. Method according to claim 1, wherein the Head Related Transfer Function (HRTF) calculation is performed prior to the processing step b) based on the anthropometric features of the user.

7. Method according to claim 1, wherein step a) of acquisition is carried out by at least one microphone array placed above the user's ear, including the step of creating the acoustic model of the anatomical district and creating the acoustic model of the user's head.

8. Method according to claim 7, wherein the acquisition step a) of is performed by two microphone arrays placed on the sides of the user's head, steps b) and c) being performed separately for the input audio signals acquired from each microphone array.

9. Method according to claim 7, wherein the Head Related Transfer Function (HRTF) is calculated based on the microphone closest to the user's ear.

10. Method according to claim 9, wherein the calculation of the Head Related Transfer Function (HRTF) includes a sub-sampling of the frequency points obtained from measurements made on the user's body.

* * * * *